UNITED STATES PATENT OFFICE.

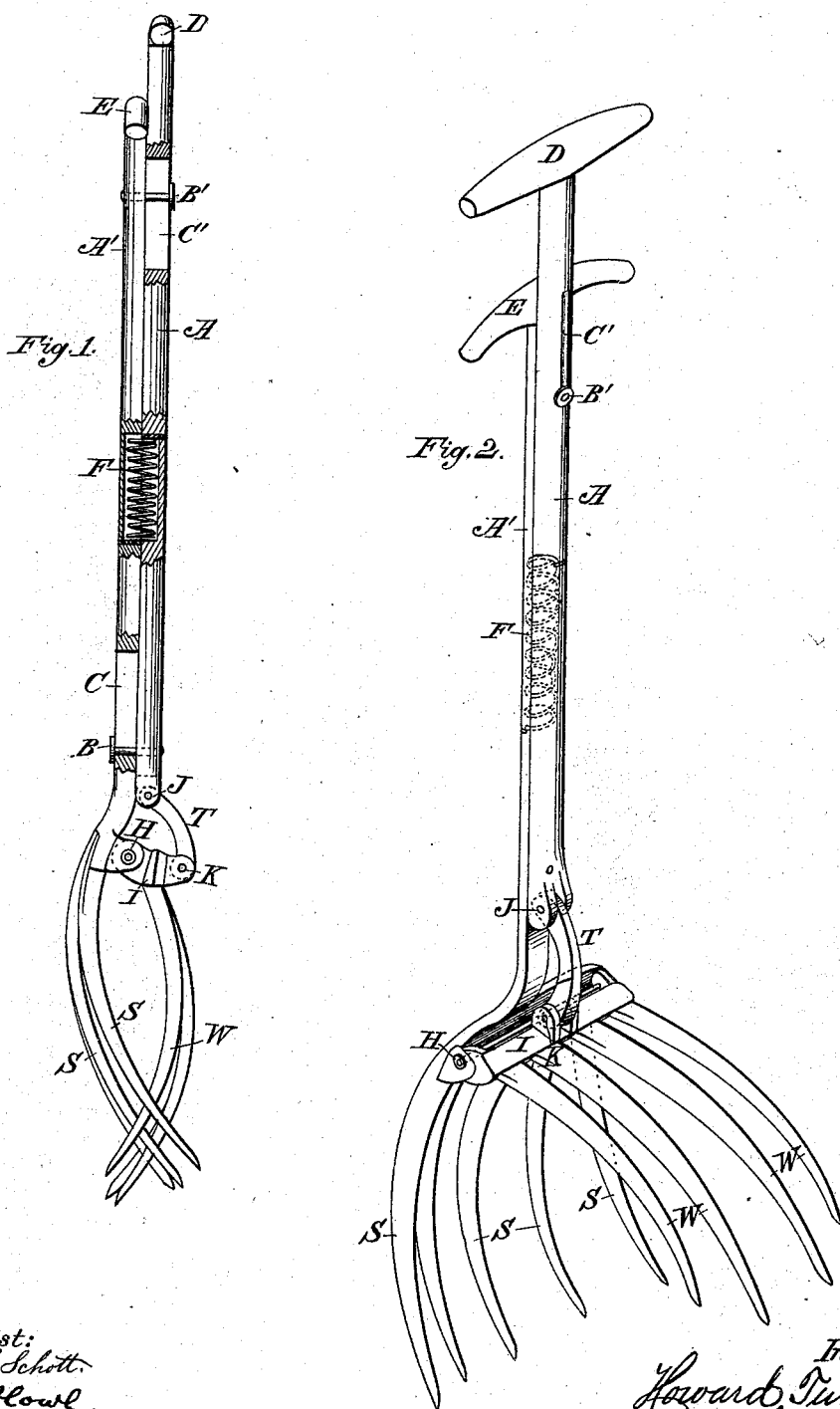

HOWARD TURNER, OF BOSTON, MASSACHUSETTS.

IMPROVEMENT IN CULINARY IMPLEMENTS.

Specification forming part of Letters Patent No. 211,357, dated January 14, 1879; application filed December 14, 1878.

*To all whom it may concern:*

Be it known that I, HOWARD TURNER, of the city of Boston, county of Suffolk, and State of Massachusetts, have invented certain new and useful Improvements in Culinary Implements, whereof the following is such a full and exact description as will enable others to make and use the same.

The object of this invention is to furnish an improved kitchen utensil, which I call "artificial fingers," by means of which hot or dirty articles, such as coals and cinders, may be handled with impunity.

The implement will also be found very useful for removing vegetables and other articles of food from the pot in which they are cooked; and the invention consists in the especial construction and arrangement of the several parts of the device, as will be hereinafter fully described, and then specifically pointed out in the claims.

In the accompany drawings, Figure 1 shows the implement with the tines or fingers closed as when grasping an object. Fig. 2 shows them open, in which position they are held by the action of a spring until closed by the operator.

The parts designated by the letters A and A' are the two halves of the handle-rod, and are made of any desired length, each being semicircular in cross-section, so that when the two are placed with their flat sides in contact they form a cylinder, the two parts being attached to each other by means of the rivets B and B', which are firmly secured in one of the parts, but move freely in the slots C or C' of the other, thus allowing each of the two parts of the cylinder to have a limited longitudinal movement with relation to the other.

Secured to one end of the parts A A' are the handles D and E, by which the implement is operated; and to assist in this operation, by retaining the tines or fingers in an open position when employed in grasping some article, is the spiral spring F, inclosed in a recess formed for its reception in the parts A and A', one-half of the spring occupying a corresponding recess in each of the parts, so that when the tines are closed together in the act of grasping an article, as shown in Fig. 1, the spring will be compressed; but upon letting go of either handle D or E it will cause the tines to open, as shown by Fig. 2.

The series of tines S S are formed as a part of or securely attached to the rod A', and are immovable, while the series of tines W W are formed as a part of or are securely attached to the block I, which is hinged to the rod A' by the joint H, and is further connected to the rod A, through which the tines W are operated, by the connecting-rod T, jointed to the block and rod A by the pivots J and K.

It will be seen that by closing the hand upon the handles D E, thus drawing them closer together, the series of tines W will close in upon the tines S, thus causing them to hold firmly any article between them until released by the user.

This implement will be found very handy for kitchen use.

I am aware that a somewhat similar arrangement of parts has been applied to devices used for the purpose of picking fruit, but they lacked the peculiar construction and adaptation of parts to each other shown by my invention, and which enables it to be successfully employed as a culinary implement.

Having thus described my invention, I claim as new, and desire to secure by Letters Patent, the following:

1. In a culinary implement, the rods A and A', semicircular in cross-section, and provided with suitable handles, and united by the rivets B and B', moving in slots in the rods, in combination with the inclosed spring F, substantially as and for the purpose set forth.

2. The handled rod A, connection T, jointed block I, with its tines W, in combination with the rod A', having fixed tines S, and the inclosed spring F, all constructed and arranged for joint operation in the manner shown and described.

HOWARD TURNER.

Witnesses:
  D. J. ABBOT,
  J. C. TASKER.